United States Patent
Ree et al.

(10) Patent No.: US 8,837,346 B2
(45) Date of Patent: Sep. 16, 2014

(54) REPEATER PASS-THROUGH MESSAGING

(75) Inventors: Bradley Richard Ree, Cumming, GA (US); Robert Warren Hepler, Wylie, TX (US); Ryan Marc LaFrance, Marietta, GA (US); Vernon Meadows, Lilburn, GA (US)

(73) Assignee: General Electric Company, Schenectady, NY (US)

( * ) Notice: Subject to any disclaimer, the term of this patent is extended or adjusted under 35 U.S.C. 154(b) by 252 days.

(21) Appl. No.: 13/151,234

(22) Filed: Jun. 1, 2011

(65) Prior Publication Data

US 2012/0307708 A1 Dec. 6, 2012

(51) Int. Cl.
*H04W 88/04* (2009.01)
*H04L 12/46* (2006.01)
*H04L 12/28* (2006.01)
*H04L 12/715* (2013.01)

(52) U.S. Cl.
CPC .............. *H04L 12/462* (2013.01); *H04L 45/04* (2013.01); *H04L 12/28* (2013.01)
USPC ........... 370/315; 370/236; 370/252; 370/405; 709/203; 709/213; 709/249

(58) Field of Classification Search
CPC ....... H04L 12/28; H04L 12/462; H04L 45/04; H04L 45/20; H04L 45/52; H04W 40/00
USPC ......... 370/315, 229, 230, 235, 236, 242, 252; 370/389, 392, 394, 395.5, 405, 472, 352; 375/211–215; 455/7, 13.1, 14; 709/200, 203, 212, 213, 217, 224–230, 709/249, 250
See application file for complete search history.

(56) References Cited

U.S. PATENT DOCUMENTS

| | | | |
|---|---|---|---|
| 5,805,816 A * | 9/1998 | Picazo et al. | 709/223 |
| 6,522,650 B1 * | 2/2003 | Yonge et al. | 370/390 |
| 6,678,283 B1 * | 1/2004 | Teplitsky | 370/463 |
| 6,788,568 B2 | 9/2004 | Hidaka | |
| 7,020,822 B2 | 3/2006 | Ho et al. | |
| 7,230,935 B2 * | 6/2007 | Proctor et al. | 370/315 |
| 7,321,291 B2 * | 1/2008 | Gidge et al. | 375/258 |
| 7,359,332 B2 * | 4/2008 | Kolze et al. | 370/252 |
| 7,421,528 B1 | 9/2008 | Yin et al. | |

(Continued)

FOREIGN PATENT DOCUMENTS

WO 02/13440 A2 2/2002
WO 2006/047185 A2 5/2006

OTHER PUBLICATIONS

Search Report issued in connection with EP Application No. 12170293.0, Sep. 5, 2012.

*Primary Examiner* — Jeffrey M Rutkowski
*Assistant Examiner* — Rasha Fayed
(74) *Attorney, Agent, or Firm* — William Heinze; Hoffman Warnick LLC

(57) ABSTRACT

Embodiments of this invention include a network communications stack for a system for communicating data over a network. A media access control (MAC) layer running on a radio processor of the communications stack at least partially processes messages received from a network, i.e., before the message is passed to a host processor. Specifically, the MAC layer includes software configured to analyze a destination address contained in the message, and determine whether the destination address contained in the message matches a destination address programmed in the MAC layer.

10 Claims, 3 Drawing Sheets

(56) References Cited

U.S. PATENT DOCUMENTS

| | | |
|---|---|---|
| 7,424,661 B2 | 9/2008 | Fujimoto |
| 7,468,979 B2* | 12/2008 | Ricciulli ............ 370/392 |
| 7,676,195 B2 | 3/2010 | Ratiu et al. |
| 2002/0091844 A1* | 7/2002 | Craft et al. ............ 709/230 |
| 2003/0163579 A1* | 8/2003 | Knauerhase et al. ...... 709/230 |
| 2005/0105524 A1* | 5/2005 | Stevens et al. ............ 370/389 |
| 2006/0097573 A1* | 5/2006 | Gidge et al. ............ 307/3 |
| 2007/0091871 A1* | 4/2007 | Taha ............ 370/352 |
| 2008/0123558 A1* | 5/2008 | Chhabra ............ 370/254 |
| 2010/0095020 A1* | 4/2010 | Rixner et al. ............ 709/233 |
| 2010/0208730 A1* | 8/2010 | Henderson et al. ............ 370/389 |
| 2011/0107084 A1* | 5/2011 | Hubner et al. ............ 713/153 |
| 2011/0116375 A1* | 5/2011 | Friedman et al. ............ 370/235 |
| 2012/0022741 A1* | 1/2012 | Moore et al. ............ 701/33 |
| 2012/0163362 A1* | 6/2012 | Noh et al. ............ 370/338 |

\* cited by examiner

REPEATER PASS-THROUGH MESSAGING

BACKGROUND OF THE INVENTION

The subject matter disclosed herein relates generally to meter technology, and more particularly, to repeater pass-through messaging in a radio frequency (RF) advanced metering infrastructure (AMI) network.

As utility meters have evolved from simple devices to track consumption of a utility service at a given location, to so-called "smart meters," wireless mesh networks have been used to enable two-way intelligent networked communications with smart meters. For example, a radio frequency (RF) advanced metering infrastructure (AMI) network can be used to transmit data between the utility meters and a host system, e.g., a utility company.

In known systems, when transmitting data over an RF AMI network, multiple nodes can often receive messages not intended for them. Typically a radio transceiver will process a received message by sending the message to the host processor using an interrupt signal and a serial connection. This process can be resource and time consuming especially if the message is not intended for the node.

BRIEF DESCRIPTION OF THE INVENTION

Embodiments of this invention include a network communications stack for a system for communicating data over a network. A media access control (MAC) layer running on a radio processor of the communications stack at least partially processes messages received from a network, i.e., before the message is passed to a host processor. Specifically, the MAC layer includes software configured to analyze a destination address contained in the message, and determine whether the destination address contained in the message matches a destination address programmed in the MAC layer. If it is determined that the destination address contained in the message matches a destination address programmed in the MAC layer., the MAC layer is further configured to process the message. If it is determined that the destination address contained in the message does not match a destination address programmed in the MAC layer, the MAC layer is further configured to retransmit the message through a physical (PHY) layer back to the network.

A first aspect of the disclosure provides a system for communicating data over a network, the system comprising: a network communications stack including: a physical (PHY) layer configured to receive and transmit messages to and from a network; and a media access control (MAC) layer including a destination address programmed therein, the MAC layer configured to receive a message from the PHY layer; wherein the MAC layer includes software configured to: analyze a destination address contained in the message; and determine whether the destination address contained in the message matches the destination address programmed in the MAC layer; wherein in response to a determination that the destination address contained in the message matches the destination address programmed in the MAC layer, the software in the MAC layer is configured to transmit the message to a higher layer on the network communications stack, and in response to a determination that the destination address contained in the message does not match the destination address programmed in the MAC layer, the MAC layer is configured to retransmit the message through the PHY layer back to the network.

A second aspect of the disclosure provides a system for communicating data over a radio frequency (RF) advanced metering infrastructure (AMI) network, the system comprising: a utility meter including: a network communications stack including: a physical (PHY) layer configured to receive and transmit messages to and from a network; a media access control (MAC) layer including a destination address programmed therein, the MAC layer configured to receive a message from the PHY layer, wherein the MAC layer includes software configured to: analyze a destination address contained in the message; and determine whether the destination address contained in the message matches the destination address programmed in the MAC layer; and a network layer, wherein in response to a determination that the destination address contained in the message matches the destination address programmed in the MAC layer, the MAC layer is configured to transmit the message to the network layer, and wherein in response to a determination that the destination address contained in the message does not match the destination address programmed in the MAC layer, the MAC layer is configured to retransmit the message through the PHY layer back to the network.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
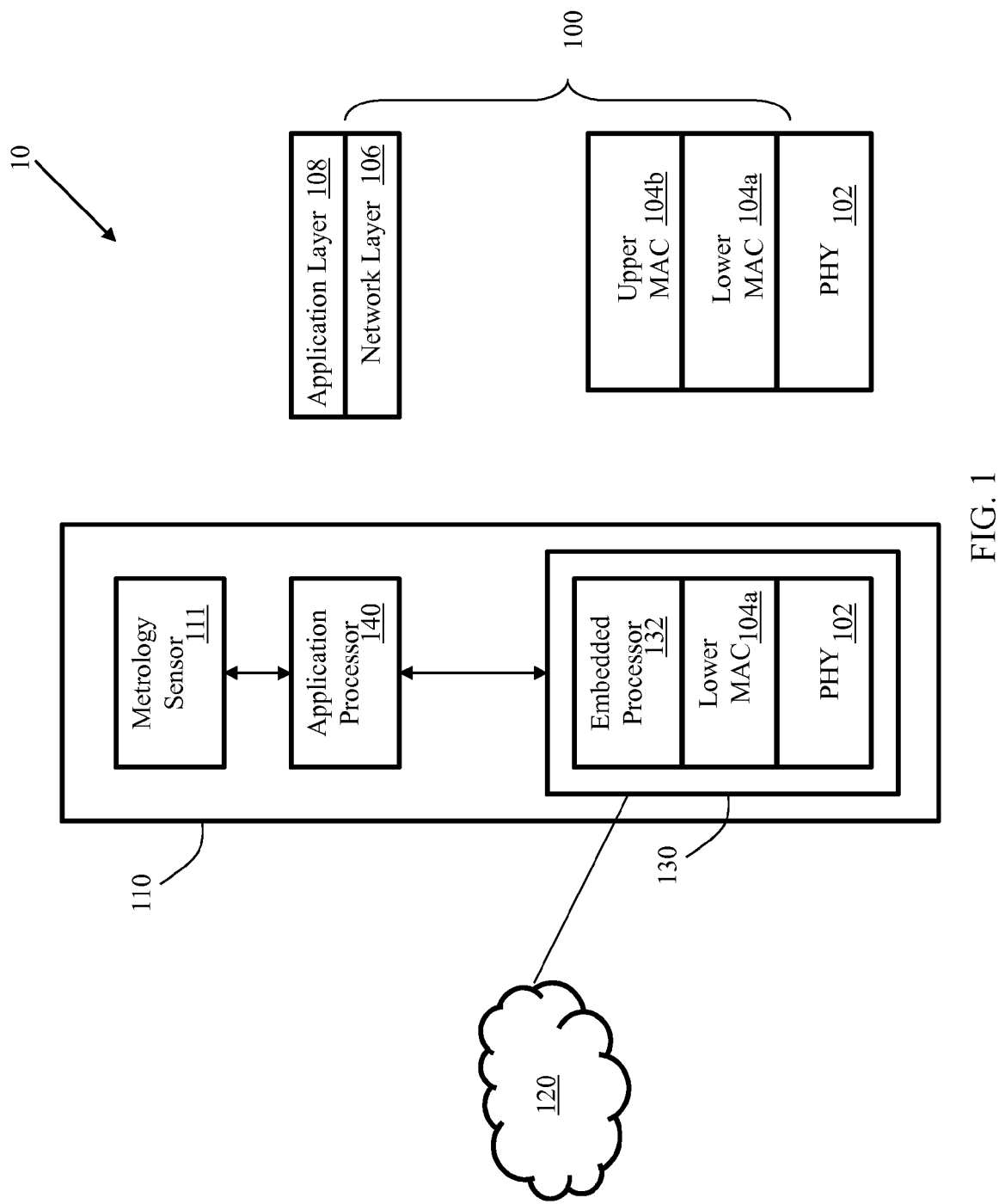
FIG. 1 shows an illustrative meter processing communication system including a network communications stack according to an embodiment of the invention.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As will be appreciated by one skilled in the art, the system described herein may be embodied as a system(s), method(s) or computer program product(s), e.g., as part of a communication system. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module," "network" or "system." Furthermore, the present invention may take the form of a computer program product embodied in any tangible medium of expression having computer-usable program code embodied in the medium.

Any combination of one or more computer usable or computer readable medium(s) may be utilized. The computer-useable or computer-readable medium may be, for example but not limited to, an electronic, magnetic, optical, electro-magnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages.

Figure 2:
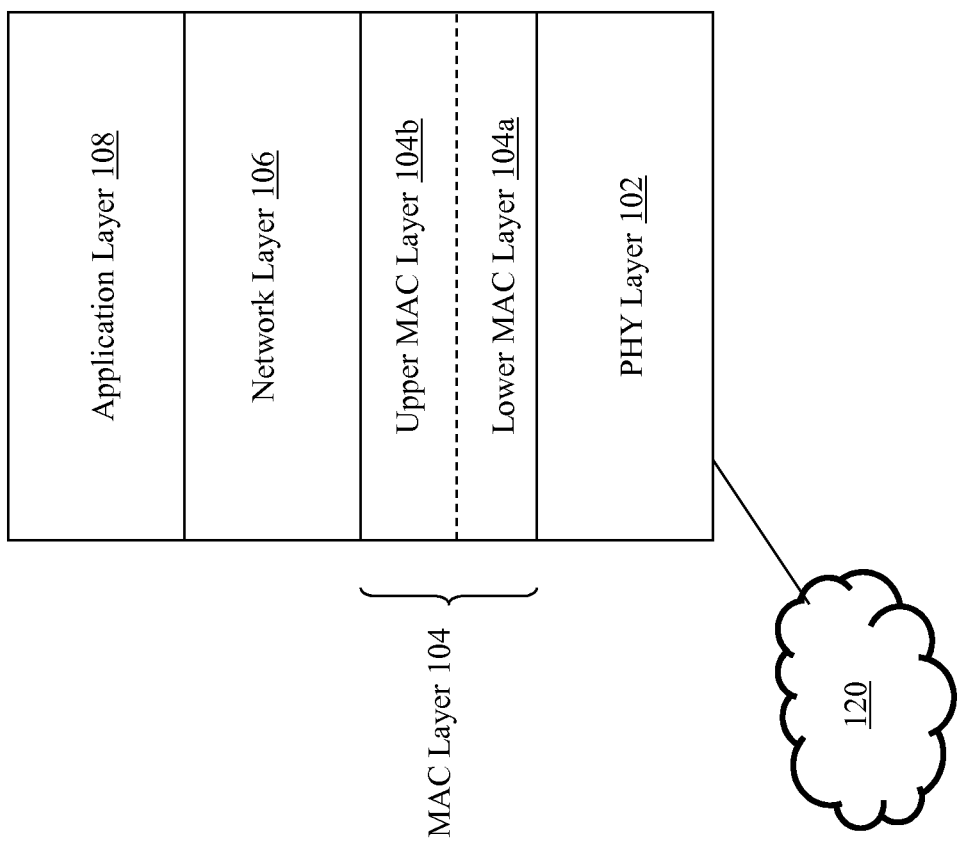
FIG. 2 shows a network communications stack according to an embodiment of the invention.
Figure 3:
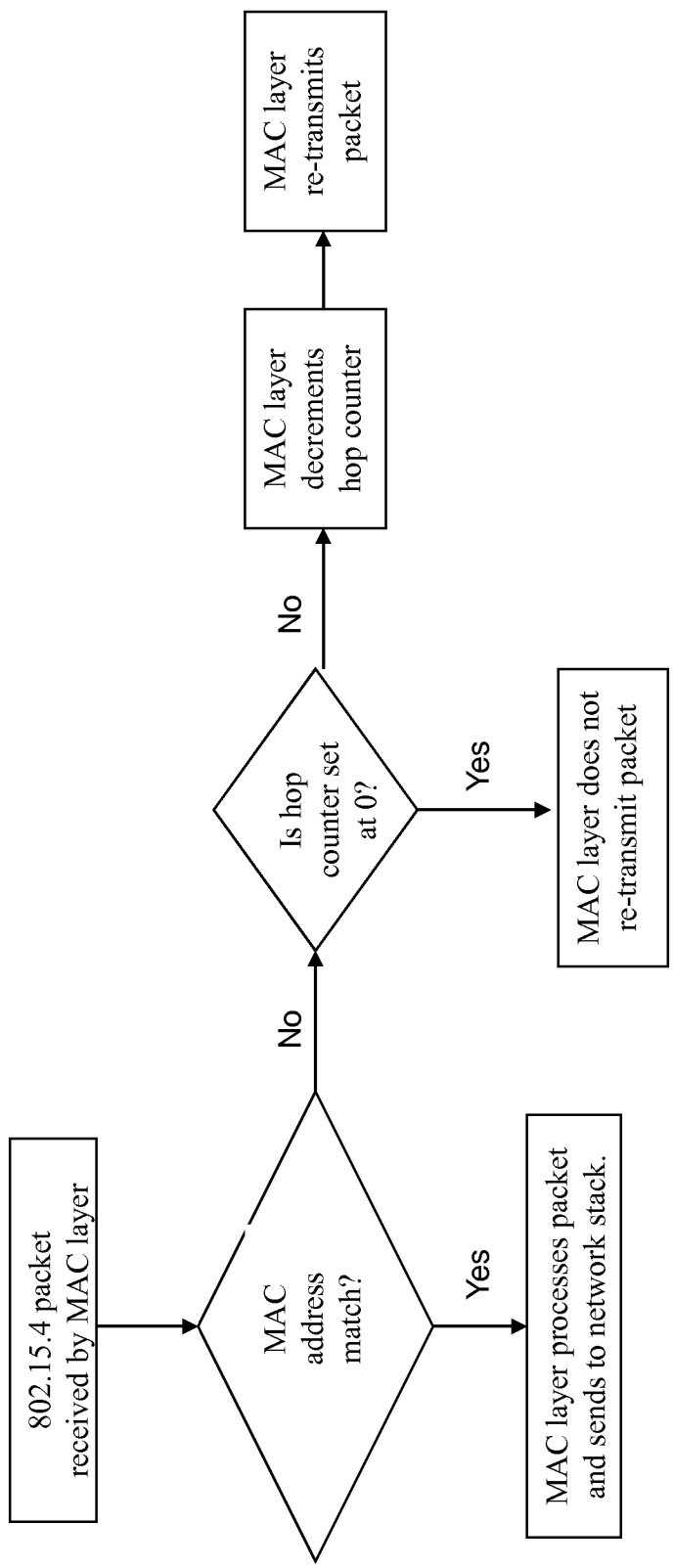
FIG. 3 shows a flow chart for processing of a message by a MAC layer in the network communications stack according to an embodiment of the invention.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in FIGS. 1-3.

Turning to the figures, embodiments of a meter processing communication system are shown. Each of the components in the figures may be connected via conventional means, e.g., via wireless mesh, WiFi, power line communication, cellular, a common conduit or other known means as is indicated in FIGS. 1-3. Specifically, referring to FIG. 1, a schematic illustration of a meter processing communication system 10 is shown. Meter processing communication system 10 may include both hardware and software elements included in a utility meter 110, as shown in FIG. 1. Hardware elements can include a metrology sensor 111, an application processor 140, and a radio chip 130. Utility meter 110 may comprise an electrical meter, a water meter, a gas meter or any other form of utility meter for sensing and compiling metrology data, as is known in the art. Hardware elements running on radio chip 130 can include an embedded processor 132, a hardware layer 104a of a media access control (MAC) layer 104, and a physical (PHY) layer 102. Software elements of system 10 can include a communications stack 100, running partially on radio chip 130, and partially on a host processor (i.e., application processor 140), which is discussed in more detail in connection with FIG. 2.

Network 120 may comprise multiple physical interfaces including but not limited to radio, mesh network, WiFi, and power line carrier interfaces. In one embodiment, network 120 can comprise a plurality of networks, including a Home Area Network (HAN) and a Neighborhood Area Network (NAN). In an embodiment of the invention, system 10 receives messages, or communications, including distinct protocols from network 120. Application processor 140 and communications stack 100 process, route and encrypt the received messages. Application processor 140 and communications stack 100 distribute the messages to network 120. Further, the various elements of system 10 may communicate with network 120 and/or one or more other computer systems using any type of communications link. The communications link may include any combination of various types of wired and/or wireless links; may include any combination of one or more types of networks; and/or utilize any combination of various types of transmission techniques and protocols.

For example, in a mesh advanced metering infrastructure (AMI) network, a plurality of meters 110 can be provided, with each meter 110 capable of participating as the final consumer or a repeater node. Meter reading and control data is sent through this network. For example, a meter could have a message sent to it to update pricing information, control a demand response relay, send a remote disconnect of power to the home, configure the type of measurements the meter should take, code upgrades, etc. Each message will contain a destination address associated with the message to indicate which meter (or destination device) the message is intended for.

When any meter 110 receives a message, i.e., a packet, the destination address of the packet is checked to determine if the packet should be consumed by that meter, or forwarded through the mesh network to another meter. In another example, a home are network running ZigBee operates similar to the AMI mesh network, but can also include messaging to control demand response/load control devices, in home displays, electric vehicle chargers, and other appliances. In another example, some power line carrier (PLC) networks also use mesh networking Even though the data is not sent over the air in a PLC network, it is still transmitted along the power lines of the utility. However, a single meter may not be able to reach the final destination, and thus mesh networking is used to retransmit the messages along multiple nodes on the power line.

Turning to FIG. 2, a network communications stack 100 for a radio frequency (RF) AMI network according to an embodiment of the invention is shown. Communications stack 100 includes at least four layers, a physical (PHY) layer 102, a media access control (MAC) layer 104, a network layer 106, and an application layer 108. As understood by one in the art, PHY layer 102 is configured to receive and transmit messages, i.e. packets, to and from the network. PHY layer 102 and MAC layer 104 can run on a separate processor than network layer 106 and application layer 108. In one embodiment, at least a portion of MAC layer 104 runs on radio chip 130 (FIG. 1) (with radio chip 130 coupled to a portion of MAC layer 104 and PHY layer 102), while network layer 106 and application layer 108 can run on a host processor, distinct from radio chip 130 (FIG. 1). In one embodiment, MAC layer 104 and PHY layer 102 are compliant to the IEEE 802.15.4 standard, and network layer 106 and application layer 108 can be part of a ZigBee specification.

Network layer 106 and application layer 108 are referred to herein as "higher" layers than PHY layer 102 and MAC layer 104, because as discussed in more detail herein, messages travel up communications stack 100 from layers 102, 104, up to higher layers 106, 108.

In one embodiment of the invention, network communications stack 100 is part of a system for communicating data over a network, wherein the data comprises metrology data (such as usage totals or consumption patterns) received from utility meter 110 through metrology sensor 111.

In operation, PHY layer 102 is connected to a network 120, and receives a message from network 120. PHY layer 102 then sends the message to MAC layer 104. As known in the art, MAC layer 104 can have a first portion and a second portion, i.e., a first portion, i.e., upper MAC layer 104b comprising software, and a second portion, i.e., lower MAC layer 104a comprising hardware. In prior art systems, the message is then sent to the higher layers, i.e., network layer 106 and application layer 108, and the full message is only processed once it reaches higher layers 106, 108, i.e., the host processor. If the message is not received by the node to which it was intended for, the host processor must send the message back down communications stack 100, and the process repeats itself until the message reaches the correct node.

Embodiments of this invention include at least partial processing of the message in MAC layer 104, i.e., before the message is passed to the host processor. In an embodiment of the invention, upper MAC layer 104b includes software configured to at least partially process the message. Upper MAC layer 104b includes software in which a destination address is programmed. This destination address corresponds to an address for the intended destination device associated with communications stack 100 on the network, for example, MAC layer 104b would include a destination address for the meter 110 in which it resides. Software in upper MAC layer 104b is further configured to analyze a destination address contained in the message, and determine whether a destination address contained in the message matches the destination address programmed in MAC layer 104. If it is determined that the destination address contained in the message matches a destination address programmed in MAC layer 104, MAC layer 104 is further configured to process the message. If it is determined that a destination address contained in the message does not match the destination address programmed in MAC layer 104, MAC layer 104 is further configured to retransmit the message through PHY layer 102 back to network 120.

In addition, every time MAC layer 104 retransmits the message, MAC layer 104 is further configured to modify a portion of the message prior to retransmission. For example, if it is determined that a destination address contained in the message does not match the destination address programmed in MAC layer 104, MAC layer 104 is further configured to analyze a hop counter associated with the message. Upon initial transmission, a value in the hop counter is set to X. Every time a node retransmits the packet, the value is decremented. If the packet is received, and the counter is 0, then the packet will not be retransmitted. If the counter is set to a value other than 0, MAC layer 104 can be further configured to decrement the hop counter before retransmitting. This mechanism prevents packets from being retransmitted forever through a network. There may also be other portions of the packet that can be updated every time a packet is retransmitted into the mesh network. Those portions could also be changed in the processing done at MAC layer 104. While retransmission is discussed herein in connection with retransmission of the data portion of the message, control and routing portions of the message may also change. In any case, the packet which will be retransmitted does not get passed to the application processor. The required changes may be accomplished with either hardware or software means in MAC layer 104.

Embodiments of the invention disclosed herein make AMI network processing more efficient by programming MAC layer 104 (of a Zigbee/6LoWPAN network stack) to include an algorithm that instructs MAC layer 104 to only process packets (i.e., send the packet up to a higher level in the communications stack) in which there is a MAC address match. In other words, MAC layer 104 is configured to disregard IEEE 802.15.4 packets in which the destination address in the packet and the destination address in MAC layer 104 do not match, and retransmit those non-matching packets. This partial processing in MAC layer 104 makes AMI network processing more efficient by reducing processing time and resources.

Turning to FIG. 3, a flow chart for processing of a message by MAC layer 104 in network communications stack 100 according to an embodiment of the invention is shown. As illustrated in FIG. 3, a message, i.e., an IEEE 802.15.4 packet is received by MAC layer 104. MAC layer 104 analyzes the message and determines whether a destination address in the message matches a destination address programmed in MAC layer 104. If yes, MAC layer 104 recognizes that the message is intended for utility meter or device associated with the communication stack, and therefore processes the packet, i.e., sends the packet up the network stack to the higher levels in the stack. If no, MAC layer 104 recognizes that the message is intended for another utility meter or device. First, MAC layer 104 will analyze a hop counter associated with the message, if the hop counter is already at 0, MAC layer 104 will not retransmit the message. If the hop counter is set at a value other than 0, MAC layer 104 will decrement the hop counter and then MAC layer 104 will re-transmit the packet into the network.

Central processor 140 can comprise any general purpose computing article of manufacture capable of executing computer program code installed by a user. However, it is understood that central processor 140, utility meter 110, communications stack 100 and network 120 are only representative of various possible equivalent computing devices that may perform the various process steps of the disclosure. To this extent, in other embodiments, the system can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, meter processing communication system 10 is only illustrative of various types of computer infrastructures for implementing the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

As previously mentioned and discussed herein, communications stack 100 has the technical effect of enabling MAC layer 104 to partially process meter messages as described herein. It is understood that some of the various components shown in FIGS. 1-3 can be implemented independently, combined, and/or stored in memory for one or more separate computing devices that are included in central processor 140. Further, it is understood that some of the components and/or functionality may not be implemented, or additional schemas and/or functionality may be included as part of meter processing communication system 100.

The meter processing communication system of the present disclosure is not limited to any one particular meter, electrical meter, smart meter or other system, and may be used with other power and communication systems and/or systems (e.g., wireless router, network hub, server, etc.). Additionally, the meter processing communication system of the present invention may be used with other systems not described herein that may benefit from the teachings or embodiments of the invention.

As discussed herein, various systems and components are described as "communicating" data. It is understood that the corresponding data can be obtained using any solution. For example, the corresponding system/component can generate and/or be used to generate the data, retrieve the data from one or more data stores or sensors (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for communicating data over a network, the system comprising:
   a host processor;
   a radio chip processor; and
   a network communications stack running partially on the host processor and partially on the radio chip processor, the network communications stack including:
      a network layer running on the host processor;
      an application layer running on the host processor;
      a physical (PHY) layer running on the radio chip processor that is configured to receive and transmit messages to and from the network; and
      a media access control (MAC) layer including a destination address programmed therein, the MAC layer running on the radio chip processor and configured to receive a message from the PHY layer, wherein the MAC layer includes software configured to:
         analyze a destination address contained in the message; and
         determine whether the destination address contained in the message matches the destination address programmed in the MAC layer;
      wherein in response to a determination that the destination address contained in the message matches the destination address programmed in the MAC layer, the software in the MAC layer is configured to transmit the message to a higher layer on the network communications stack including the network layer and the application layer, wherein the higher layer in the network communications stack runs on the host processor, distinct from the radio chip processor, and
      in response to a determination that the destination address contained in the message does not match the destination address programmed in the MAC layer, the MAC layer is configured to retransmit the message through the PHY layer back to the network, prior to retransmitting the message, the MAC layer analyzing a hop counter associated with the message, wherein the MAC layer does not retransmit the message in response to determining that the hop counter is at 0, while the MAC layer decrements the hop counter and retransmits the message through the PHY layer back to the network in response to determining that the hop counter is set at a value other than zero.

2. The system of claim 1, wherein the higher layer is part of a ZigBee specification.

3. The system of claim 1, wherein the network comprises a radio frequency (RF) advanced metering infrastructure (AMI) network.

4. The system of claim 1, wherein the MAC layer and the PHY layer are compliant to the IEEE 802.15.4 standard.

5. The system of claim 1, wherein the data comprises metrology data received from a utility meter.

6. The system of claim 1, wherein the MAC layer is connected to a network stack, the network stack is connected to an application, and the application is connected to a utility meter.

7. A system for communicating data over a radio frequency (RF) advanced metering infrastructure (AMI) network, the system comprising:
   a utility meter including:
   a host processor;
   a radio chip processor distinct from the host processor;
   a network communications stack running partially on the host processor and partially on the radio chip processor, the network communications stack including:
      a network layer running on the host processor;
      an application layer running on the host processor;
      a physical (PHY) layer running on the radio chip processor and configured to receive and transmit messages to and from a network;
      a media access control (MAC) layer including a destination address programmed therein, the MAC layer running on the radio chip processor and configured to receive a message from the PHY layer, wherein the MAC layer includes software configured to:
         analyze a destination address contained in the message; and
         determine whether the destination address contained in the message matches the destination address programmed in the MAC layer;
      wherein in response to a determination that the destination address contained in the message matches the destination address programmed in the MAC layer, the MAC layer is configured to transmit the message to the network layer, and
      wherein in response to a determination that the destination address contained in the message does not match the destination address programmed in the MAC layer, the MAC layer is configured to retransmit the message through the PHY layer back to the network, prior to retransmitting the message, the MAC layer analyzing a hop counter associated with the message, wherein the MAC layer does not retransmit the message in response to determining that the hop counter is at 0, while the MAC layer decrements the hop counter and retransmits the message through the PHY layer back to the network in response to determining that the hop counter is set at a value other than zero.

8. The system of claim 7, wherein the data comprises metrology data received from the utility meter.

9. The system of claim 7, wherein the MAC layer is connected to a network stack, the network stack is connected to an application, and the application is connected to the utility meter.

10. The system of claim 7, wherein the MAC layer and the PHY layer are compliant to the IEEE 802.15.4 standard.

* * * * *